Patented June 11, 1929.

1,716,874

UNITED STATES PATENT OFFICE.

HECTOR RUSSELL CARVETH, OF NIAGARA FALLS, NEW YORK, ASSIGNOR TO THE ROESSLER & HASSLACHER CHEMICAL COMPANY, OF NEW YORK, N. Y., A CORPORATION OF NEW YORK.

PREPARATION OF SODIUM PERBORATE.

No Drawing. Application filed September 27, 1927. Serial No. 222,404.

This invention relates to the production of sodium perborate from borax and has for its object a process employing sodium peroxide and hydrogen peroxide as oxidizing agents.

Sodium perborate has been produced by a process employing sodium peroxide and which is represented by the following equation:

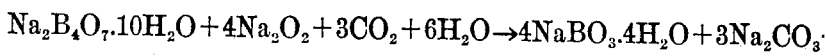

$$Na_2B_4O_7 \cdot 10H_2O + 4Na_2O_2 + 3CO_2 + 6H_2O \rightarrow 4NaBO_3 \cdot 4H_2O + 3Na_2CO_3.$$

The above process has the disadvantage in that 6 mols of sodium are lost as sodium carbonate; this cannot be profitably recovered. In addition there is a 6 to 7% borax loss and only an 88–89% oxygen efficiency obtained.

It has also been proposed to prepare the perborate using hydrogen peroxide in accordance with the following:

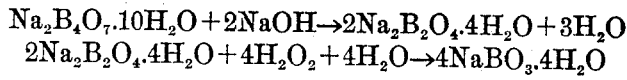

$$Na_2B_4O_7 \cdot 10H_2O + 2NaOH \rightarrow 2Na_2B_2O_4 \cdot 4H_2O + 3H_2O$$
$$2Na_2B_2O_4 \cdot 4H_2O + 4H_2O_2 + 4H_2O \rightarrow 4NaBO_3 \cdot 4H_2O$$

This process, however, employs a relatively expensive oxidizing agent.

I have now discovered a process wherein oxygen yields are high, very little borax is lost and a minimum cost attained by reason of there being no waste products.

My process involves the use of both sodium peroxide and hydrogen peroxide. The sodium peroxide is used in the first stage of the reaction to partially complete the oxidation and at the same time furnish the extra sodium for the perborate from borax, then in order to avoid waste and contamination I complete the conversion to perborate by oxidation with hydrogen peroxide. The complete balance is shown by the following:

$$Na_2B_4O_7 \cdot 10H_2O + Na_2O_2 + 3H_2O_2 + 3H_2O \rightarrow 4(NaBO_3 \cdot 4H_2O)$$

I believe the two stages of my process, embodied in the above reaction, are as follows:

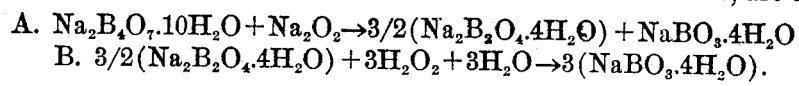

A. $Na_2B_4O_7 \cdot 10H_2O + Na_2O_2 \rightarrow 3/2(Na_2B_2O_4 \cdot 4H_2O) + NaBO_3 \cdot 4H_2O$ B. $3/2(Na_2B_2O_4 \cdot 4H_2O) + 3H_2O_2 + 3H_2O \rightarrow 3(NaBO_3 \cdot 4H_2O)$.

Due to the fact that no by-products are formed I can reuse the mother liquor repeatedly in subsequent batches in a cyclic process, it only being necessary to discard this when the impurities brought in with the raw materials become excessive. The large benefits derived from my process in comparison with the all $Na_2O_2$ process are (1) no loss of sodium (2) no by-product loss or cost of removal, eliminating $CO_2$ treatments (3) 70% reduction in refrigeration costs.

By reacting thus one mol of borax with one mol of sodium peroxide and 3 mols hydrogen peroxide, I have obtained a high grade free flowing, well crystallized product free of metaborate, salt, carbonate, etc.; I have obtained an exceptional oxygen efficiency of 95–96% and practically a 100% borax conversion in a 10 cycle process, i. e. reusing the mother liquors.

In operating my process I first dissolve borax in water and cool to below about 15° C. or I add the borax to the cold mother liquor from a preceding batch; this liquor is usually at 0–5° C. I then add the sodium peroxide and allow the temperature of the solution to rise to about 12–20° C., preferably about 15° C. and maintained at this temperature for a time in order to secure complete conversion of the borax to metaborate. If the temperature rises over 20° C. loss of oxygen will occur through decomposition of the perborate already formed and evolution of dissolved oxygen; if the temperature is much below 15° C. considerable borax remains unchanged. The solution is now cooled to 8 to 12° C. and the hydrogen peroxide added. If the temperature here is much below 10° C. the reaction is retarded and when it does start it will be so rapid as to be out of control resulting in foaming, loss of oxygen, etc.; if the temperature is much above 10° C. the perborate crystal formation is not as satisfactory because of too rapid reaction.

Further details as to my process are given in the following example:

In the first cycle 646 pounds of borax were mixed in 1800 pounds of water in a reaction pot of 5000 lbs. water capacity, equipped with an agitator and brine cooling. 133 pounds of $Na_2O_2$ were then added in a period of 10 minutes with constant agitation. The temperature of the solution was allowed to rise to 15° C. and then maintained at 10–15° C. for 30 minutes after the peroxide had been added; during this reaction period the solution of the borax and its conversion to metaborate were completed. In addition to the metaborate formation there is a partial oxidation to perborate. The metaborate liquor was then cooled to 10° C. and 630 pounds of 27.6% hydrogen peroxide were added at a uniform rate, requiring 90 minutes for the addition; a temperature of 10° C. was maintained by brine cooling during the addition of the hydrogen peroxide. The above proportions of chemicals allow 1 pound excess of sodium peroxide to neutralize the 0.2% acidity of the hydrogen peroxide used, and 2 pounds excess hydrogen peroxide to compensate in oxidation for 96% sodium peroxide used.

The contents of the tank were now agitated for one hour, meanwhile lowering the temperature to about 0° C. to complete the crystallization of the perborate. The crystallized sodium perborate was separated in a centrifuge; as there were only traces of other salts present washing of the product was unnecessary. The crystals were now dried at 36–40° C. for 15 hours after which they were free flowing and non-hygroscopic. Perborate loses water of crystallization quite rapidly above 40° C.

The mother liquor coming from the centrifuge consisted of a saturated solution of sodium perborate at that temperature along with negligible amounts of borax, metaborate, and impurities introduced with the raw materials and was now utilized to prepare the borax solution for the next cycle or batch, which was carried through as before. 10 cycles were run without gathering sufficient impurities in the liquor to contaminate the product.

The increase in water, over the 1800 pounds added as such, is about 760 pounds per cycle calculated from the water of crystallization of the borax and the water introduced with the 27.6% hydrogen peroxide; of this water, about 540 pounds is removed with the wet perborate leaving a net increase of about 215 to 220 pounds of water per cycle. This was allowed to remain. At the end of the 10th cycle all of the liquor was discarded.

In the 10 cycles, run as above, 6460 pounds of borax were used, 1330 pounds of sodium peroxide and 6295 pounds of hydrogen peroxide which gave 10,381 pounds dry sodium perborate having an average oxygen content of 9.91%; this shows an oxygen yield of 95.2% and a yield of 99.7% of theoretical based on the borax used. The mother liquors at the end of 10 cycles analyzed 0.138% $B_2O_3$, 0.526% $Na_2O$ and 0.57% $Na_2SO_4$. The borax in the mother liquor calculated then was 0.376% $Na_2B_4O_7.10H_2O$ (from 0.138% $B_2O_3$) or 14.04 pounds in 4000 pounds of liquor. The perborate from the 10 cycles averaged 9.91% available oxygen, 95.4% $NaBO_3.4H_2O$, 0.82% $Na_2B_2O_4$, 1.62% $Na_2B_4O_7$, 0.89% $Na_2CO_3$ and 0.036% $Na_2SO_4$.

Claims:

1. Process for the production of sodium perborate which comprises adding sufficient sodium peroxide to an aqueous borax solution to convert the borax to metaborate and partially to perborate and then adding sufficient hydrogen peroxide to complete the oxidation of metaborate to perborate.

2. Process for the production of sodium perborate which comprises adding one mol of sodium peroxide to one mol of borax in an aqueous solution and then adding sufficient hydrogen peroxide to complete the oxidation to perborate.

3. Process for the production of sodium perborate which comprises adding one mol of sodium peroxide to one mol of borax in an aqueous solution and then adding 3 mols of hydrogen peroxide.

4. Process for the production of sodium perborate which comprises adding sufficient sodium peroxide to an aqueous borax solution to convert the borax to metaborate and the latter partially to perborate, and then adding sufficient hydrogen peroxide to complete the conversion of metaborate to perborate, while maintaining such temperature as to prevent decomposition of formed perborate.

5. Process for the production of sodium perborate which comprises adding one mol of sodium peroxide to one mol of borax in an aqueous solution at a temperature of about 12–20° C. and then adding sufficient hydrogen peroxide to complete the oxidation to perborate while maintaining the solution at a temperature of about 8–12° C.

6. Process for the production of sodium perborate which comprises adding one mol of sodium peroxide to one mol of borax in an aqueous solution at a temperature of about 12–20° C. and then adding 3 mols of hydrogen peroxide while maintaining the solution at a temperature of about 8–12° C.

7. Process for the production of sodium perborate which comprises adding sufficient sodium peroxide to an aqueous borax solution at a temperature of about 12–20° C. to convert the borax to metaborate and partially to perborate and then adding sufficient hydrogen peroxide to complete the oxidation of metaborate to perborate at a temperature of about 8–12° C. cooling to 0° C., separating the perborate crystals and returning the mother liquor for solution of fresh borax.

8. Process for the production of sodium perborate which comprises adding sufficient sodium peroxide to an aqueous borax solution at a temperature of about 15° C. to convert the borax to metaborate and partially to perborate and then adding sufficient hydrogen peroxide to complete the oxidation of metaborate to perborate while maintaining the solution at a temperature of about 10° C.

9. Process for the production of sodium perborate which comprises adding one mol of sodium peroxide to one mol of borax in an aqueous solution at a temperature of about 15° C. and then adding sufficient peroxide to complete the oxidation to perborate while maintaining the solution at a temperature of about 10° C.

10. Process for the production of sodium perborate which comprises adding one mol of sodium peroxide to one mol of borax in an aqueous solution at a temperature of about 15° C. and then adding 3 mols of hydrogen peroxide while maintaining the solution at a temperature of about 10° C.

11. Process for the production of sodium perborate which comprises adding sufficient sodium peroxide to an aqueous borax solution at a temperature of about 15° C. to convert the borax to metaborate and partially to perborate and then adding sufficient hydrogen peroxide to complete the oxidation of metaborate to perborate at a temperature of about 10° C. cooling to 0° C., separating the perborate crystals and returning the mother liquor for solution of fresh borax.

12. Process for the production of sodium perborate which comprises adding sufficient sodium peroxide to an aqueous borax solution at a temperature of about 12-20° C to convert the borax to metaborate and partially to perborate and then adding sufficient hydrogen peroxide to complete the oxidation of metaborate to perborate at a temperature of about 8-12° C. cooling to 0° C., separating the perborate crystals, returning the mother liquor for solution of fresh borax and repeating the process.

13. Process for the production of sodium perborate which comprises adding sufficient sodium peroxide to an aqueous borax solution at a temperature of about 15° C. to convert the borax to metaborate and partially to perborate and then adding sufficient hydrogen peroxide to complete the oxidation of metaborate to perborate at a temperature of about 10° C. cooling to 0° C., separating the perborate crystals, returning the mother liquor for solution of fresh borax and repeating the process.

Signed at Niagara Falls in the county of Niagara and State of New York this 22nd day of September, A. D. 1927.

HECTOR RUSSELL CARVETH.